United States Patent [19]
Stallone et al.

[11] Patent Number: 5,344,239
[45] Date of Patent: Sep. 6, 1994

[54] SQUEEZE FILM BEARING DAMPER WITH ANNULAR END PLENUMS

[75] Inventors: Michael J. Stallone; Daniel E. Mollmann, both of Cincinnati, Ohio

[73] Assignee: General Electric Company, Cincinnati, Ohio

[21] Appl. No.: 982,192

[22] Filed: Nov. 25, 1992

[51] Int. Cl.⁵ .............................................. F16C 32/06
[52] U.S. Cl. ...................................................... 384/99
[58] Field of Search ................ 384/99, 535, 581, 119, 384/215; 277/71-74

[56] References Cited

U.S. PATENT DOCUMENTS

| | | | |
|---|---|---|---|
| 3,589,782 | 6/1971 | Le Breton et al. | 384/215 |
| 3,844,630 | 10/1974 | Lechner | 384/99 |
| 4,046,430 | 9/1977 | Buono et al. | 384/99 |
| 4,213,661 | 7/1980 | Marmol | 384/99 |
| 4,214,796 | 7/1980 | Monzel et al. | 384/581 X |
| 4,337,983 | 7/1982 | Hibner | 384/99 X |
| 4,392,751 | 7/1983 | Ida et al. | 384/99 |
| 4,527,912 | 7/1985 | Klusman | 384/99 |
| 4,838,028 | 6/1989 | Witt | 384/99 X |
| 4,867,655 | 9/1989 | Barbic et al. | 384/99 X |
| 4,947,639 | 8/1990 | Hibner et al. | 384/99 |
| 4,971,457 | 11/1990 | Carlson | 384/99 |
| 5,067,825 | 11/1991 | Vance et al. | 384/99 |
| 5,071,262 | 12/1991 | Monzel et al. | 384/99 |
| 5,201,585 | 4/1993 | Gans et al. | 384/99 |
| 5,228,784 | 7/1993 | Bobo | 384/99 |

OTHER PUBLICATIONS

"Experimental Measurement of the Dynamic Force Response of a Squeeze-Film Bearing Damper", John M. Vance and Alan J. Kirton Transactions of the ASME, Nov., 1975.

*Primary Examiner*—Thomas R. Hannon
*Attorney, Agent, or Firm*—Jerome C. Squillaro; Nathan D. Herkamp

[57] ABSTRACT

A sealed squeeze film damper having double annular wall sealed plenums at the open ends of the damper which seal the damper and prevent air from being sucked into a sealed film damper thereby preventing degradation of damper performance due to air entrainment in the damper fluid. This significantly improves the damper performance by preventing air entrainment in the damper fluid.

8 Claims, 1 Drawing Sheet

SQUEEZE FILM BEARING DAMPER WITH ANNULAR END PLENUMS

BACKGROUND OF THE INVENTION

1. Field of the Invention This invention relates to vibration damping of bearing assemblies in turbomachinary, and more particularly to bearing squeeze film dampers.

2. Description of Related Art

Turbomachinary such as high speed gas turbine engines employ bearings to support the rotating shafts of the engine. Typically a ball bearing is used to carry thrust, and the remainder of the bearings are roller bearings. Oil is a fluid typically used to lubricate and cool the bearing and bearing assemblies. A major problem facing designers and manufacturers of high speed turbine engines is the vibration and dynamic loads caused by rotor and shaft unbalance and by self-excited whirl (i.e. dynamic instability). Higher shaft speeds and the use of long slender shafts to drive large forward mounted fans in modern multi-spool gas turbine fan jet engines have made the problem more acute.

It is well known in the turbomachinary field to use squeeze-film bearing dampers to reduce the adverse vibrations due to high-speed rotor dynamics. Using a typical rolling-element bearing as an example, the outer race of the rolling-element bearing is fitted loosely in a bearing support housing, with a radial clearance which is a small percentage of the bearing radius depending on the design. Radial and orbital motion of the rolling-element bearing outer race is permitted but rotation is prevented by some type of mechanical restraint. The annular clearance thus formed is kept filled with oil, a typical damper fluid, and hydrodynamic forces are generated by the motion of the bearing under the influence of unbalance or other excitation. The squeeze film acts as a nonlinear spring and damper system which if properly designed can significantly reduce the dynamic loads and suppress dynamic instability.

The occurrence of cyclical orbital motion of the shaft of a gas turbine engine rotor as a result of dynamic instability and rotor unbalance is well known, and fluid damping means such as squeeze film dampers are utilized to dampen orbital and other undesirable shaft motion. In general, such squeeze-film dampers use a pressurized fluid, such as an oil, in a small damper annulus between a bearing support element, such as the outer circumferential surface of a rolling element bearing outer race, and an opposing annular wall of an annular bearing housing chamber in which the race is confined with permitted limited radial motion. Damper fluid is introduced into the defined annular damper annulus between the circumferential outer race and the annular housing, and vibratory or orbital motion of the bearing race causes the race to exert a squeezing action on the damper fluid to move or distribute the fluid throughout the defined damper annulus.

Two types of squeeze film dampers, sealed and unsealed are generally known. One type of unsealed squeeze-film damper is disclosed in of U.S. Pat. No. 5,071,262 entitled "Squeeze Film Damper Fluid Control" and includes a piston ring for damper fluid sealing outboard of a fluid plenum groove adjacent to each end of the squeeze film annulus. The fluid plenum groove serves as a lower pressure receiver for damper fluid and as a reservoir to receive and supply fluid during pumping action of the squeeze-film damper.

The present invention addresses the sealed type damper. Typically, spaced apart opposite piston type sealing rings are disposed in annular grooves between the bearing race and the housing as axial fluid seals for the damper annulus. The orbital motion of the bearing race causes the race to exert a rotational squeezing action on the damper fluid which causes a pumping action that generates a lower pressure in the squeeze film annulus on the suction side of the pumping cycle. This action causes the squeeze-film damper to suck air in from the sump through paths across the end seals on the low pressure side of the squeeze-film damper. This can cause air entrainment in the oil which has been found to significantly reduce the squeeze-film damper performance and result in erratic damper behavior. This ingestion of air in the damper fluid is a condition referred to as gaseous cavitation (air entrainment) which is to be distinguished from vapor cavitation (oil boiling in the low pressure side of the squeeze-film damper).

SUMMARY OF THE INVENTION

A fluid squeeze film damper is provided with double annular wall end sealing annular plenums that are outboard of the pressurized damping annulus. Each plenum is axially bounded by two spaced apart sealing rings and has a plenum radial height that is substantially larger than the damper radial height so as to be operable as a plenum for the damper and be able to supply and receive leakage oil from the damper annulus. Each of the plenums and the damper annulus are provided with its own damper fluid supply.

One embodiment provides for a squeeze-film damper in accordance with the present invention in a gas turbine engine having the damper annulus disposed between a bearing housing and an outer race of a rolling element bearing that is spaced radially inward of the housing.

ADVANTAGES

The present invention provides a sealed squeeze film damper having double wall sealed plenums at both ends of the damper which seals the damper and prevents air from being sucked into a sealed film damper. The present invention significantly improves the damper performance by preventing air entrainment in the damper fluid. The invention has another advantage of being able to supply oil from its plenums to augment the oil pumped out of the damper. The invention provides the advantage of operating the plenums at a low pressure which makes it easy to seal the damper and makes the assembly more reliable than conventional sealed film dampers. The low pressure plenums also have the advantage of not cavitating or generating significant pressure variation under the orbiting motion of the rotor thereby preventing air from being sucked into the plenum and from coming into contact with the damper seals and being ingested into the oil in the film of the damper.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
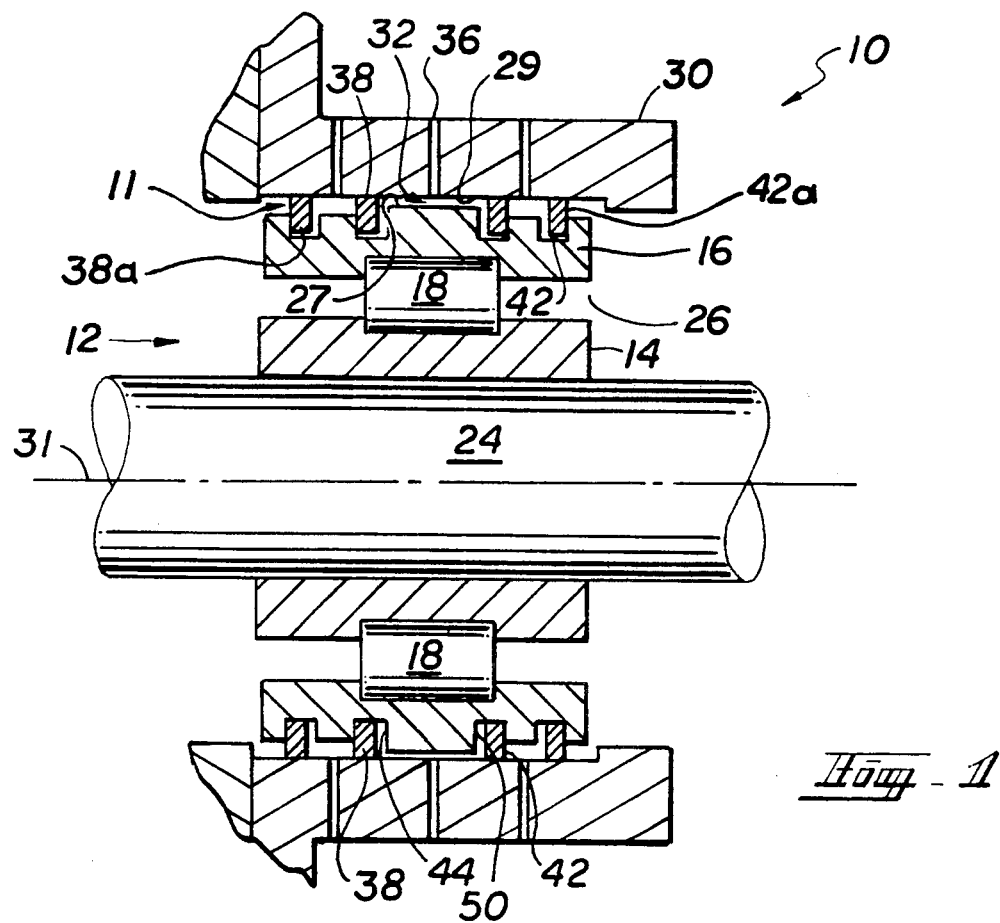
FIG. 1 is a cross-sectional schematic illustration of a roller bearing assembly having a sealed squeeze film

Referring now to FIG. 1 a roller bearing assembly 10 having a squeeze film damper assembly 11 is schematically illustrated in conjunction with a rolling element bearing 12. Bearing 12 comprises an inner annular race 14 and an annular outer race 16 between which rolling elements 18 are positioned to support a shaft 24 for rotation. As illustrated in FIG. 1 bearing 12 including outer race 16 is disposed in a closely confining annular bearing chamber 26 within a bearing housing 30 such that when the shaft 24 deflects the bearing 12 and in particular the outer race 16 may move in the radial direction normal to a shaft rotational centerline 31. An outer cylindrical surface 27 of outer race 16 is spaced from an inner cylindrical surface 29 of the bearing housing 30 to define an annular squeeze film chamber or annulus 32. Bearing assembly 12, together with shaft 24 therein, is permitted to move in the radial direction around the centerline 31 in an orbital motion within the bearing chamber 26.

However, this movement is controlled or restricted by oil under pressure entering the squeeze film annulus 32 through a film oil inlet 36 where the compressing or squeezing action of outer race 16 on the fluid generates a resisting force to orbital motion of shaft 24. This apparatus is referred to as a squeeze film damper and finds particular application to rotating machinery, for example, to dampen vibration in the rotor shaft of an aircraft or other type of gas turbine engine. For the purpose of clarity relative direction conventions are used to describe the invention. Forward is to the left of the squeeze film annulus 32 and aft is to the right of the squeeze film annulus 32. Axially inner and outer is with respect to the squeeze film annulus 32 because it is generally considered the axial center of the bearing for the purposes of this patent.

Oil is retained or constrained in squeeze film annulus 32 by means of axially spaced apart and oppositely disposed forward and aft inner seal rings 38 and 42 fitted in corresponding forward and aft inner annular ring grooves 44 and 50, respectively, in the outer circumference of outer race 16. It is an important function of rings 38 and 42 to retain oil in squeeze film annulus 32 in a proscribed pressure range by minimizing oil leakage past the rings from the squeeze film annulus 32.

Figure 2:
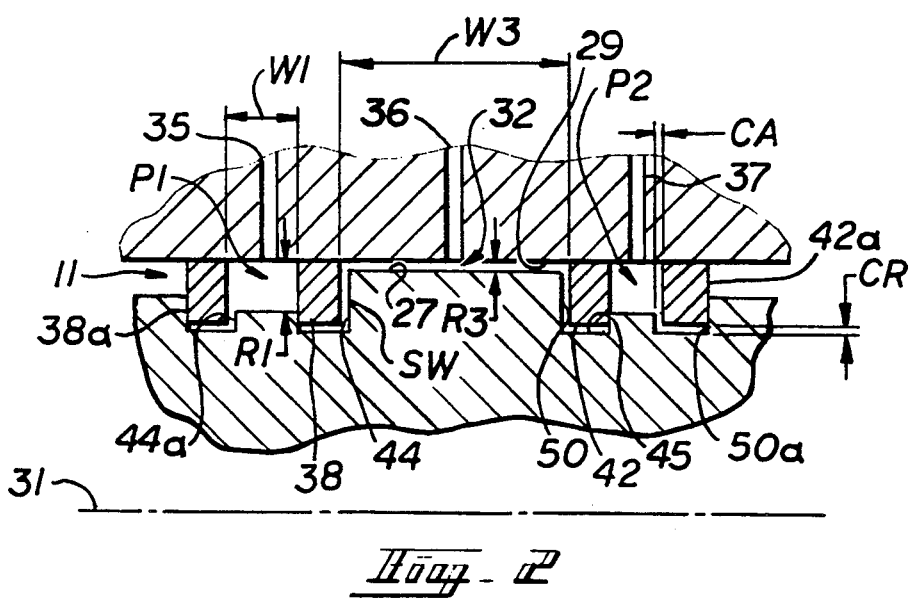
FIG. 2 is an enlarged view of the squeeze film section of a squeeze film damper illustrated in FIG. 1.

During operation of a squeeze film damper as described, particularly with respect to a gas turbine engine, shaft 24 will tend to develop some orbital motion in addition to its usual shaft rotation. Referring more particularly to FIG. 2, this orbital motion causes a pressure cycling around the squeeze film annulus 32 and the low pressure portion of the cycle can cause air to be drawn from outside the bearing housing 30 through the forward and aft inner seal rings 38 and 42 respectively.

Therefore, the present invention provides forward and aft outer seal rings 38a and 42a fitted in corresponding forward and aft outer annular ring grooves 44a and 50a, respectively, in the outer circumference of outer race 16, thus forming double wall sealed forward and aft plenums P1 and P2 between the forward seal rings and the aft seal rings respectively. The inner and outer rings serve as inboard and outboard, with respect to the squeeze film annulus, annular walls of the plenums. The average squeeze film annulus radial height R3 is much smaller than the plenum radial height R1 of forward and aft plenums P1 and P2. In one embodiment the ratio of R1/R3 is about 3 or greater.

The forward and aft plenums P1 and P2 are supplied by oil (or other fluid that may be used for the bearing and/or damper) through forward and the aft plenum oil inlets 35 and 37 respectively which preferably have the same source (not shown) of oil as film oil inlet 36 at the same pressure which is relatively low though not as low as the lowest pressure that the squeeze film annulus 32 is subject too during its cycle. It should be noted that the volumetric relationship between the plenums P1 and P2 and the squeeze film annulus 32 must be such that the plenums can operate so as to receive and supply oil to the squeeze film annulus 32 as required during the pressure cycling.

It is important to note the relatively small radial clearances of the squeeze film annulus 32, as illustrated in the exemplary embodiment in the FIGS. by its radial height R3, the aft inner seal rings 38 and 42 fitted in the forward and aft inner annular ring grooves 44 and 50 respectively, as illustrated by a radial ring clearance CR, between the rings and the outer radial wall 45 of the grooves, and the aft outer seal rings 38a and 42a fitted in the forward and aft outer annular ring grooves 44a and 50a, respectively, also as illustrated by the radial ring clearance CR. Together with small axial clearances CA between the rings and the annular sidewalls SW of the grooves, these features enhance the sealing of damper's squeeze film annulus 32 by improving the sealing of the rings and thus isolating the damper's squeeze film annulus 32 from the air surrounding it, and thereby reducing and preventing air entrainment of oil in the damper. While R1/R3 is about 3 or greater, a typical set of exemplary values for the other dimensions might be a squeeze film annulus radial height R3 in range of 10 mils, an axial clearances CA in a range of 2-8 mils, and a radial ring clearance CR in a range of 12-20 mils.

The shape and size of the plenums P1 and P2 should be such that they do not restrict the free flow of the damper fluid around the plenum in response to the orbital pressure fluctuations in the damper. Note that in the exemplary embodiment illustrated in the FIGS. the relative cross-sections of the plenums P1 and P2 versus those of the squeeze film annulus 32. The ratio of the plenum width W1 to the plenum radial height R1 is illustrated in the FIGS. as being about 1.2:1 but specific designs can incorporate a W1/R1 in a wide range of values depending on specific design requirements and configurations.

The plenum radial height, R1, should be sufficiently greater than the squeeze film annulus radial height R3 such that no significant squeeze film action occurs in the plenums. This arrangement provides that plenums P1 and P2 have a sufficient supply of damper fluid for ready delivery to the pumping action occurring in the squeeze film annulus 32 while also preventing any air being sucked into the squeeze film annulus 32 and being entrained in the damper fluid. At the same time, the low pressure of the damper fluid in the plenums P1 and P2 improve the sealing of the damper and reduces oil leakage from the damper and therefore provides better fluid conservation for the damper assembly.

While the preferred embodiment of the invention has been described fully in order to explain its principles, it is understood that various modifications or alterations may be made to the preferred embodiment without departing from the scope of the invention as set forth in the appended claims.

We claim:

1. A sealed squeeze film damper disposed between radially spaced apart inner and an outer annular elements that are circumscribed about an axially extending centerline, said sealed squeeze film damper comprising;
   a squeeze film annulus radially disposed between the inner annular element and the outer annular element,
   at least one pair of annular forward and aft sealing plenums at axial spaced apart forward and aft ends respectively of said squeeze film annulus, and
   each of said annular sealing plenums having axially spaced apart forward and aft annular walls wherein said forward and aft annular walls are forward and aft rings that are partially disposed in corresponding forward and aft annular grooves in an outer circumference of one of said elements.

2. A sealed squeeze film damper as claimed in claim 1 further comprising forward plenum fluid inlets, aft plenum fluid inlets, and squeeze film fluid inlets operable to supply damper fluid to said forward sealing plenum, aft sealing plenum, and said squeeze film annulus respectively.

3. A sealed squeeze film damper as claimed in claim 2 wherein said inner annular element is an outer race of a bearing assembly and said forward and aft annular grooves are disposed in an outer cylindrical surface of said outer race.

4. A bearing assembly for rotatably supporting a shaft, said bearing assembly comprising:
   spaced apart radially inner and outer races concentrically disposed about the shaft,
   rolling elements disposed between said inner and outer races,
   a bearing housing having an inner cylindrical surface that is radially spaced from and concentric with said outer race, and
   a sealed squeeze film damper comprising;
   a squeeze film annulus radially disposed between coaxially extending portions of said inner cylindrical surface and said outer race,
   at least one pair of annular forward and aft sealing plenums at axial spaced apart forward and aft ends respectively of said squeeze film annulus, and
   each of said annular sealing plenums having axially spaced apart forward and aft annular walls wherein said forward and aft annular walls are forward and aft rings that are partially disposed in corresponding forward and aft annular grooves in an outer cylindrical surface of said outer race.

5. A bearing assembly as claimed in claim 4 further comprising forward plenum fluid inlets, aft plenum fluid inlets, and squeeze film fluid inlets operable to supply damper fluid to said forward sealing plenum, aft sealing plenum, and said squeeze film annulus respectively.

6. A bearing assembly as claimed in claim 5 wherein said plenums have a ratio of plenum width to plenum radial height of about 1.2:1.

7. A bearing assembly as claimed in claim 6 wherein said squeeze film annulus has a squeeze film annulus radial height such that a ratio of said plenum radial height to said squeeze film annulus radial height is about 3 or greater.

8. A bearing assembly as claimed in claim 7 further comprising:
   axial clearances between said rings and sidewalls of said grooves,
   radial clearances between said rings and radially outer walls of said grooves, and
   wherein said squeeze film annulus radial height is in a range of 3–30 mils, said axial clearances are in a range of 2–8 mils, and said radial clearances are in a range of 12–20 mils.

* * * * *